(12) United States Patent
Tsuchiya et al.

(10) Patent No.: US 6,907,037 B2
(45) Date of Patent: Jun. 14, 2005

(54) MULTICAST ROUTING METHOD AND AN APPARATUS FOR ROUTING A MULTICAST PACKET

(75) Inventors: Kazuaki Tsuchiya, Ebina (JP); Hidemitsu Higuchi, Ebina (JP); Sunao Sawada, Yokohama (JP); Shinji Nozaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 09/865,580

(22) Filed: May 29, 2001

(65) Prior Publication Data

US 2002/0031130 A1 Mar. 14, 2002

(30) Foreign Application Priority Data

May 30, 2000 (JP) ........................................ 2000-164720

(51) Int. Cl.[7] .............................. H04L 12/28; H04J 3/16
(52) U.S. Cl. ...................... 370/390; 370/401; 370/466
(58) Field of Search .................................. 370/381, 401, 370/432, 400, 466, 392, 390, 465

(56) References Cited

U.S. PATENT DOCUMENTS

| | | | |
|---|---|---|---|
| 5,898,686 A | | 4/1999 | Virgile |
| 6,118,784 A | | 9/2000 | Tsuchiya et al. |
| 6,272,540 B1 | * | 8/2001 | Yadav et al. ................. 370/392 |
| 6,452,915 B1 | * | 9/2002 | Jorgensen .................... 370/338 |
| 6,523,696 B1 | * | 2/2003 | Saito et al. ................... 370/401 |
| 6,708,219 B1 | * | 3/2004 | Borella et al. ............... 370/390 |
| 6,757,779 B1 | * | 6/2004 | Nataraj et al. ............... 370/466 |
| 6,804,221 B1 | * | 10/2004 | Magret et al. ............... 370/432 |

FOREIGN PATENT DOCUMENTS

| | | |
|---|---|---|
| EP | 0-840482 | 5/1998 |
| EP | 1-143680 | 3/2001 |

OTHER PUBLICATIONS

Internet Draft, draft–fenner–igmp–Proxy–0.3txt, Jul. 11, 2000.

Hinden, R. et al, "IP Version 6 Addressing Architecture", The Internet Society, RFC 2373, Jul. 1998, pp 1–18.

Fenner, W., "Internet Group Management Protocol, Version 2", The Internet Society, RFC 2236, Nov. 1997, pp. 1–24.

Deering, S., "Host Extensions for IP Multicasting", RFC 1112, Aug. 1989, pp. 1–17.

Tsirtsis, G. et al, "Network Address Translation—Protocol Translation (NAT–PT)", The Internet Society, RFC 2766, Feb. 2000, pp. 1–21.

"Universal Protocol Conversion", IBM Technical Disclosure Bulletin, vol. 38, No. 12, Dec. 1995, pp. 323–324.

* cited by examiner

*Primary Examiner*—Chau Nguyen
*Assistant Examiner*—Andy Lee
(74) *Attorney, Agent, or Firm*—Mattingly, Stanger, Malur & Brundidge, P.C.

(57) ABSTRACT

A communicating apparatus is disclosed which has been connected to both of the IPv4 network and the IPv6 network for converting an IPv4 multicast packet into an IPv6 multicast packet. The communicating apparatus, which has held the IPv6 multicast addresses, holds the IPv4 multicast addresses of a multicast group on the IPv4 network and the held IPv6 multicast addresses in correspondence with each other, said communicating apparatus having been a member of said multicast group. Moreover, the communicating apparatus converts the IPv4 multicast address of the received IPv4 multicast packet into the IPv6 multicast address held in correspondence with the IPv4 multicast address, then transmitting the multicast packet to the IPv6 network.

9 Claims, 10 Drawing Sheets

FIG. 2

IPv4 UNICAST ADDRESS TABLE (31)

| ITEM NO. | IPv4 ADDRESS |
|---|---|
| 1 | 133. 144. 93. 100 |
| 2 | 133. 144. 93. 101 |
| ⋮ | ⋮ |
| | 133. 144. 93. 200 |

FIG. 3

IPv4 MULTICAST ADDRESS TABLE (32)

| ITEM NO. | IPv4 ADDRESS |
|---|---|
| 1 | 238. 0. 0. 100 |
| 2 | 238. 0. 0. 101 |
| ⋮ | ⋮ |
| | 238. 0. 0. 200 |

FIG. 4

IPv6 UNICAST ADDRESS TABLE ~33

| ITEM NO. | IPv6 ADDRESS |
|---|---|
| 1 | 1::100 |
| 2 | 1::101 |
| . . | . . |
|  | 1::200 |

FIG. 5

IPv6 MULTICAST ADDRESS TABLE ~34

| ITEM NO. | IPv6 ADDRESS |
|---|---|
| 1 | ff1e::100 |
| 2 | ff1e::101 |
| . . | . . |
|  | ff1e::200 |

FIG. 6

IP ADDRESS CONVERSION TABLE (41)

| ITEM NO. | IPv4 ADDRESS | IPv6 ADDRESS |
|---|---|---|
| 1 | 238. 0. 0. 1 | ff1e: : 100 |
| 2 | 133. 144. 93. 2 | 1: : 100 |
| ⋮ | ⋮ | ⋮ |
| . | . | . |

FIG. 7

IPv4 MULTICAST MEMBERSHIP TABLE (51)

| ITEM NO. | IPv4 ADDRESS |
|---|---|
| 1 | 238. 0. 0. 1 |
| . | . |
| ⋮ | ⋮ |
| . | . |

IPv6 MULTICAST MEMBERSHIP TABLE 52

| ITEM NO. | IPv6 ADDRESS |
|---|---|
| 1 | ff1e::1 |
| 2 | . |
| . | . |
| . | . |
| . | . |

FIG. 14
IPv6 AND IPv4 HEADER FORMATS
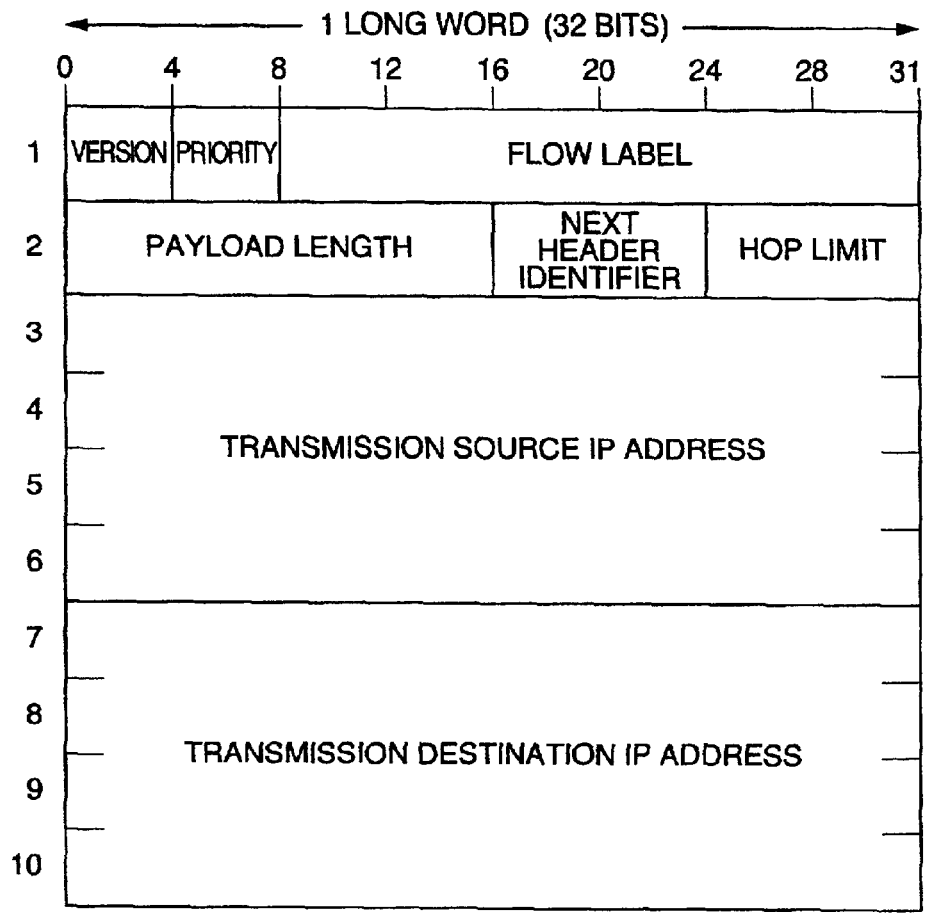
a) IPv6 HEADER FORMAT
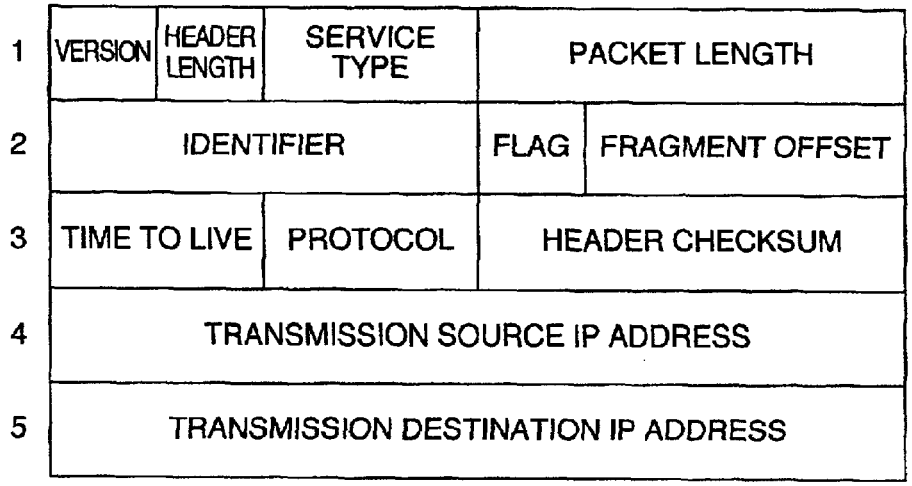
b) IPv4 HEADER FORMAT

MULTICAST ROUTING METHOD AND AN APPARATUS FOR ROUTING A MULTICAST PACKET

CROSS-REFERENCE TO RELATED APPLICATIONS

This application relates to U.S. patent application Ser. No. 09/257003 now U.S. Pat. No. 6,580,717 filed on Feb. 25, 1999 based on Japanese Patent Application Number 10-046739 filed on Feb. 27, 1998, U.S. patent application Ser. No. 09/614715 now U.S. Pat. No. 6,690,669 filed on Jul. 6, 2000 based on Japanese Patent Application Numbers 8-291480 and 9-212889, and U.S. Patent application Ser. No. 09/421275 filed on Oct. 20, 1999 based on Japanese Patent Application Number 10-299613, all of which are assigned to the present assignee. The contents of those applications are incorporated herein by reference.

BACKGROUND OF THE INVENTION

The present invention relates to an IPv4-IPv6 multicast communicating method and an IPv4-IPv6 multicast communicating apparatus in a communications network system. More particularly, it relates to a method and an apparatus for implementing the multicast communication between an IPv4 terminal using IPv4 (i.e., Internet Protocol Version 4) as the communications protocol and an IPv6 terminal using IPv6 (i.e., Internet Protocol Version 6) as the communications protocol.

As one example of the methods for implementing the communication between the IPv4 terminal and the IPv6 terminal, there can be cited a technology disclosed in U.S. Pat. No. 6,118,784 (JP-A-11-55319). This technology allows the communication between the IPv4 terminal and the IPv6 terminal in the following way: An IP address conversion table for managing the correspondence between an IPv4 address and an IPv6 address is created using DNS (i.e., Domain Name System) protocol extending technology in an apparatus located halfway in the communications path. Then, based on the IP address conversion table, an IPv4 header-IPv6 header conversion is executed, thereby allowing the communication to be implemented.

SUMMARY OF THE INVENTION

The above-cited prior art makes it possible to implement an IP unicast communication between the IPv4 terminal and the IPv6 terminal. In this prior art, however, no consideration has been given to the IP multicast communication between the IPv4 terminal and the IPv6 terminal.

It is an object of the present invention to provide a method of executing the IP multicast communication between the IPv4 terminal and the IPv6 terminal, and an apparatus for enabling the IP multicast communication to be executed.

It is another object of the present invention to provide a method of permitting the IPv6 terminal to receive an IP multicast packet transmitted from the IPv4 terminal, and an apparatus for enabling the reception to be executed.

It is still another object of the present invention to provide a method of permitting the IPv4 terminal to receive an IP multicast packet transmitted from the IPv6 terminal, and an apparatus for enabling the reception to be executed.

BRIEF DESCRIPTION OF THE DRAWINGS

FIG. 2 illustrates the configuration diagram of an IPv4 unicast address table;

FIG. 3 illustrates the configuration diagram of an IPv4 multicast address table;

FIG. 4 illustrates the configuration diagram of an IPv6 unicast address table;

FIG. 5 illustrates the configuration diagram of an IPv6 multicast address table;

FIG. 6 illustrates the configuration diagram of the IP address conversion table;

FIG. 7 illustrates the configuration diagram of an IPv4 multicast membership table;

FIG. 14 illustrates formats of the IPv6 header and the IPv4 header.

DETAILED DESCRIPTION OF THE EMBODIMENTS

Figure 1:
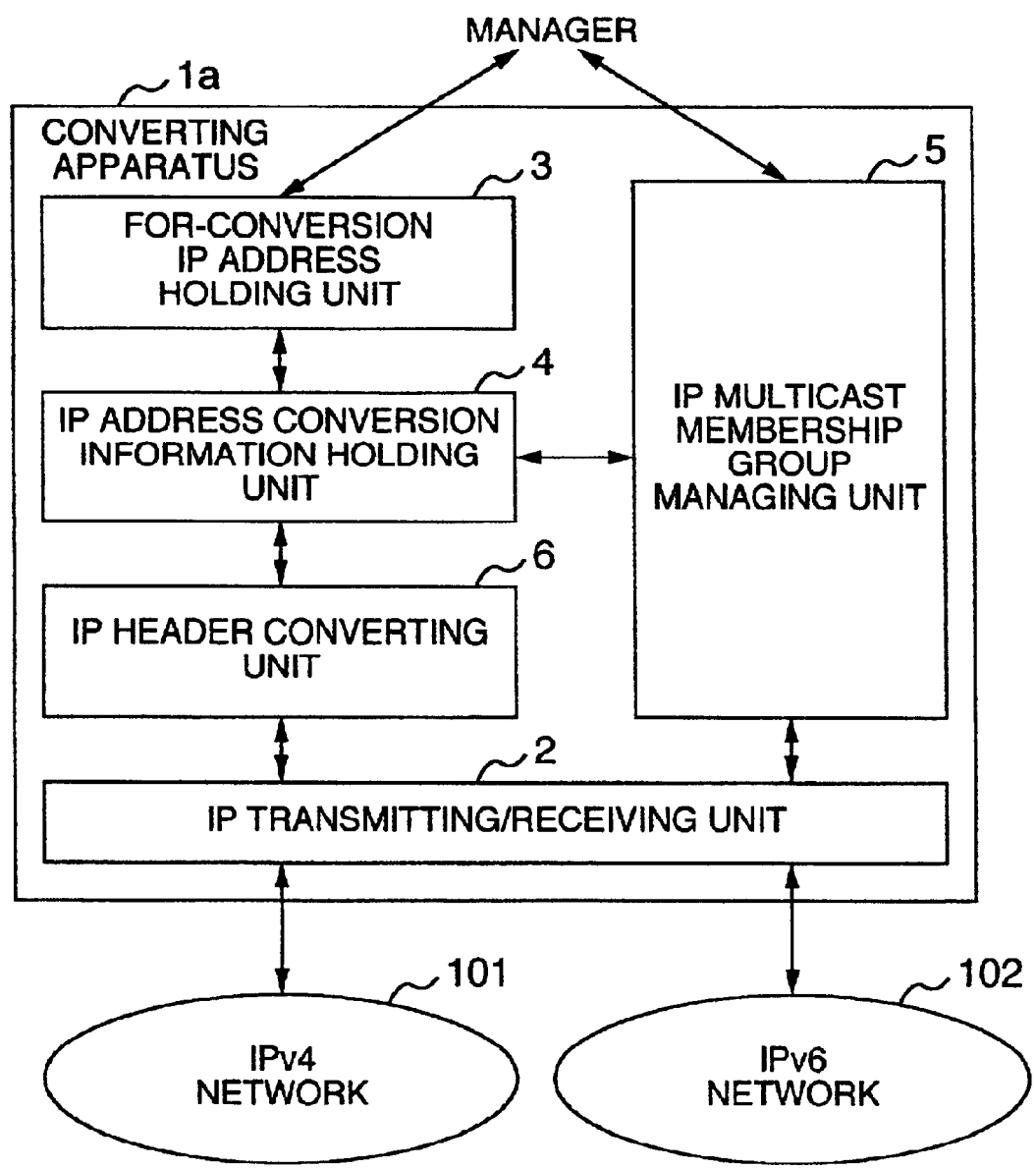
FIG. 1 illustrates the configuration diagram of a converting apparatus according to a 1st embodiment of the present invention.

Hereinafter, referring to the drawings, the explanation will be given concerning the embodiments of the present invention. Incidentally, the embodiments set no limitations to the present invention.

FIG. 1 illustrates the configuration diagram of a converting apparatus 1a according to the 1st embodiment of the present invention. The converting apparatus 1a, which is positioned between an IPv4 network 101 and an IPv6 network 102, executes the IP header conversion mutually between an IPv4 multicast packet and an IPv6 multicast packet. Based on this IP header conversion processing, the converting apparatus 1a implements the IP multicast communication between the IPv4 terminal and the IPv6 terminal. As illustrated in FIG. 1, the converting apparatus 1a includes an IP transmitting/receiving unit 2, a for-conversion IP address holding unit 3, an IP address conversion information holding unit 4, an IP multicast membership group managing unit 5, and an IP header converting unit 6.

The IP transmitting/receiving unit 2 performs the transmittance/reception of the IPv4 multicast packet with the IPv4 network 101, and the transmittance/reception of the IPv6 multicast packet with the IPv6 network 102.

The for-conversion IP address holding unit 3 holds an IPv4 unicast address, an IPv4 multicast address, an IPv6 unicast address, and an IPv6 multicast address, all of which are used for the IP header conversion. An IPv4 unicast address table 31 holds the IPv4 unicast address used for the IP header conversion. In this embodiment, the IP addresses to be held by the for-conversion IP address holding unit 3 have been registered in advance in accordance with the instruction from a manager of the converting apparatus 1a. In addition to this method, the following method is also allowable: The converting apparatus performs the communication with a DHCP server so as to automatically acquire unused addresses, then holding the unused addresses into the for-conversion IP address holding unit 3. An IPv4 multicast address table 32 holds the IPv4 multicast address used for the IP header conversion. An IPv6 unicast address table 33 holds the IPv6 unicast address used for the IP header conversion. An IPv6 multicast address table 34 holds the IPv6 multicast address used for the IP header conversion. The for-conversion IP address holding unit 3 holds and manages all of the IPv4 unicast address table 31, the IPv4 multicast address table 32, the IPv6 unicast address table 33, and the IPv6 multicast address table 34.

The IP address conversion information holding unit 4 holds the IPv4 unicast address and the IPv6 unicast address, and the IPv4 multicast address and the IPv6 multicast address in a state of being made to correspond to each other, respectively. The IP address conversion information holding unit 4 converts the IPv4 multicast address into the IPv6 multicast address held in correspondence with the IPv4 multicast address. Here, the IPv4 multicast address is an IPv4 transmission destination address of the IPv4 multicast packet broadcast (transmitted) by the IPv4 terminal on the IPv4 network 101. Moreover, the IP address conversion information holding unit 4 converts the IPv4 unicast address into the IPv6 unicast address held in correspondence with the IPv4 unicast address, the IPv4 unicast address being an IPv4 transmission source address of the above-described IPv4 multicast packet.

Also, the IP address conversion information holding unit 4 converts the IPv6 multicast address into the IPv4 multicast address held in correspondence with the IPv6 multicast address. Here, the IPv6 multicast address is an IPv6 transmission destination address of the IPv6 multicast packet broadcast (transmitted) by the IPv6 terminal on the IPv6 network 102. Moreover, the IP address conversion information holding unit 4 converts the IPv6 unicast address into the IPv4 unicast address held in correspondence with the IPv6 unicast address, the IPv6 unicast address being an IPv6 transmission source address of the above-described IPv6 multicast packet.

An IP address conversion table 41 holds the following addresses, respectively: The IPv4 transmission destination address of the IPv4 multicast packet, which has been received by the converting apparatus 1a, and the IPv6 multicast address corresponding thereto, and the IPv4 transmission source address of the above-described IPv4 multicast packet and the IPv6 unicast address corresponding thereto. Also, the IP address conversion table 41 holds the following addresses, respectively: The IPv6 transmission destination address of the received IPv6 multicast packet and the IPv4 multicast address corresponding thereto, and the IPv6 transmission source address of the above-described IPv6 multicast packet and the IPv4 unicast address corresponding thereto. The IP address conversion information holding unit 4 holds and manages the above-described IP address conversion table 41.

In accordance with the instruction from the manager of the converting apparatus 1a, the IP multicast membership group managing unit 5 performs the membership state management of the converting apparatus 1a into an IPv4 multicast group and an IPv6 multicast group. Also, the IP multicast membership group managing unit 5 instructs the IP address conversion information holding unit 4 to register the IPv4 multicast address of the IPv4 multicast group of which the converting apparatus 1a is a member and the IPv6 multicast address corresponding thereto, or the IPv6 multicast address of the IPv6 multicast group of which the converting apparatus 1a is a member and the IPv4 multicast address corresponding thereto. An IPv4 multicast membership table 51 holds the IPv4 multicast address of the IPv4 multicast group of which the converting apparatus 1a is the member. Also, an IPv6 multicast membership table 52 holds the IPv6 multicast address of the IPv6 multicast group of which the converting apparatus 1a is the member. The IP multicast membership group managing unit 5 holds and manages the IPv4 multicast membership table 51 and the IPv6 multicast membership table 52.

The IP header converting unit 6 executes the IP header conversion toward the IPv4 multicast packet transferred from the IP transmitting/receiving unit 2, thereby creating the IPv6 multicast packet. Furthermore, the IP header converting unit 6 instructs the IP transmitting/receiving unit 2 to send out the created IPv6 multicast packet to the IPv6 network 102.

FIG. 14(a) illustrates an IPv6 header format. The IPv6 header format includes the following fields: The version number of IPv6, i.e., "6", is stored into a "Version" field. The priority of a processing at the time when a router relays the packet on a network is stored into a "Priority" field. The identifier at the time of performing a priority control or the like is stored into a "Flow Label" field. The length of the data portion resulting from removing the IPv6 header portion from the packet is stored into a "Payload Length" field. The identifier as to the header of which higher-order layer's protocol will follow next to the IPv6 header or the like is stored into a "Next Header Identifier" field. The maximum transfer number of the packet is stored into a "Hop Limit" field. In addition, the transmission source IP address is stored into a "Transmission Source IP Address" field, and the transmission destination IP address is stored into a "Transmission Destination IP Address" field.

FIG. 14(b) illustrates an IPv4 header format. The IPv4 header format includes the following fields: The version number of IPv4, i.e., "4", is stored into a "Version" field. The length of the IPv4 header itself is stored into a "Header Length" field. The information indicating the service quality of a communications processing is stored into a "Service Type" field. The size of the entire packet resulting from adding the IPv4 header to the data block dealt with in the IP is stored into a "Packet Length" field. The identifier that is used as the reference information when transferring the data to the higher-order layer is stored into an "Identifier" field. The control information on the division of the packet is stored into a "Fragment Offset" field. The information indicating where the divided data (i.e., the fragments) have been positioned within the original data is stored into a "Flag" field. The time during which the packet may exist on the network is stored into a "Time To Live" field. The information indicating what the higher-order layer's protocol is is stored into a "Protocol" field. The checksum of the IP header is stored into a "Header Checksum" field. In addition, the transmission source IP address is stored into a "Transmission Source IP Address" field, and the transmission destination IP address is stored into a "Transmission Destination IP Address" field.

The IP header converting unit 6 executes the processing of converting the IPv4 header to the IPv6 header, both of which are illustrated in FIG. 14, or the processing of converting the IPv6 header to the IPv4 header. Then, the converting unit 6 sets the values in the respective fields within the IPv4 or the IPv6 header format after having been converted. Incidentally, in the following explanation concerning the present embodiment, an attention will be focused on, in particular, the address conversion of the transmission source IP address and the transmission destination IP address out of the IP header conversion processing. Accordingly, the description will be given mainly regarding the conversion processing of the "Transmission Source IP Address" field and the "Transmission Destination IP Address" field.

In this IP header conversion, the IP header converting unit 6 makes an inquiry of the IP address conversion information holding unit 4, thereby acquiring the IPv6 multicast address corresponding to the IPv4 transmission destination address of the IPv4 multicast packet. Then, using the IPv6 multicast address acquired from the IP address conversion information holding unit 4, the IP header converting unit 6 converts the IPv4 transmission destination address into the IPv6 transmission destination address. Similarly, the IP header converting unit 6 makes an inquiry of the IP address conversion information holding unit 4, thereby acquiring the IPv6 unicast address corresponding to the IPv4 transmission source address of the IPv4 multicast packet. Then, using the IPv6 unicast address acquired from the IP address conversion information holding unit 4, the IP header converting unit 6 converts the IPv4 transmission source address into the IPv6 transmission source address.

Furthermore, the IP header converting unit 6 creates the IPv4 multicast packet from the IPv6 multicast packet transferred from the IP transmitting/receiving unit 2, then instructing the IP transmitting/receiving unit 2 to send out the IPv4 multicast packet to the IPv4 network 101. In this IP header conversion, the IP header converting unit 6 makes an inquiry of the IP address conversion information holding unit 4, thereby acquiring the IPv4 multicast address corresponding to the IPv6 transmission destination address of the IPv6 multicast packet. Then, using the acquired IPv4 multicast address, the IP header converting unit 6 converts the IPv6 transmission destination address of the above-described IPv6 multicast packet into the IPv4 transmission destination address. The IP header converting unit 6 makes an inquiry of the IP address conversion information holding unit 4, thereby acquiring the IPv4 unicast address corresponding to the IPv6 transmission source address of the IPv6 multicast packet. Then, using the acquired IPv4 unicast address, the IP header converting unit 6 converts the IPv6 transmission source address of the above-described IPv6 multicast packet into the IPv4 transmission source address.

Figure 13:
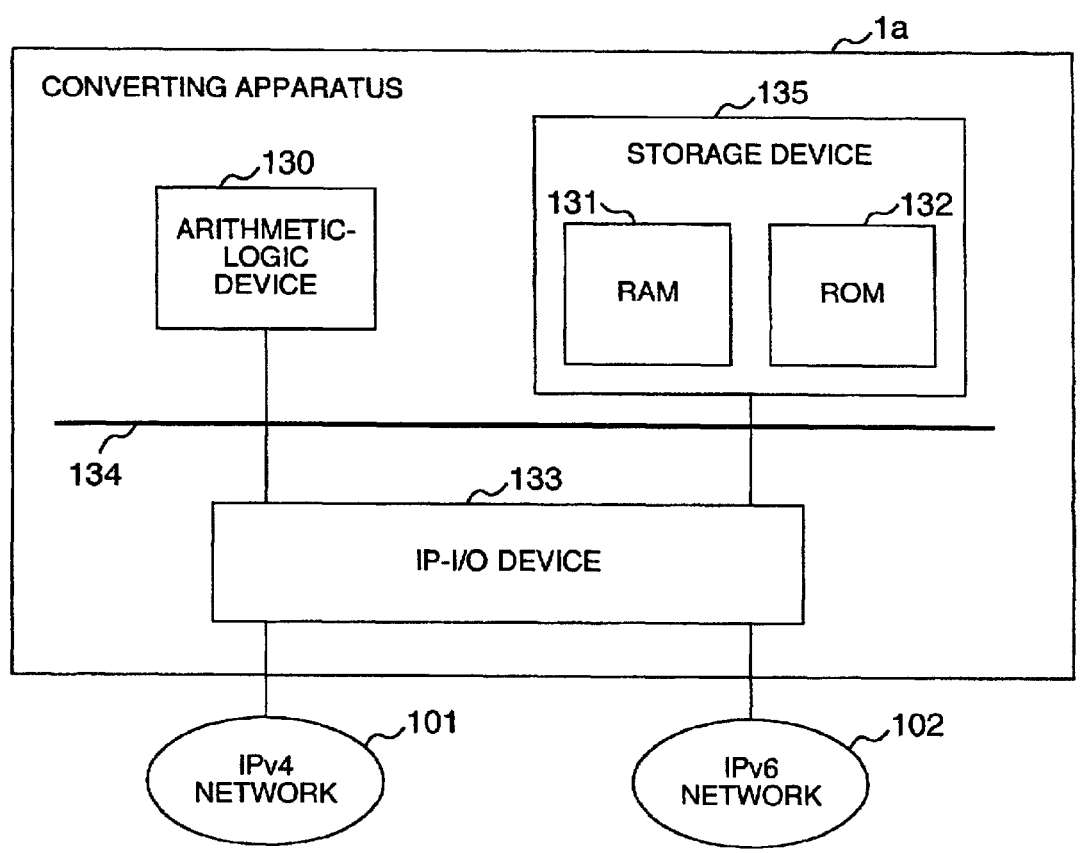
FIG. 13 illustrates an example of the hardware configuration diagram of the communicating apparatus according to the present invention.

FIG. 13 illustrates an example of the hardware configuration of the converting apparatus illustrated in FIG. 1. In FIG. 13, the converting apparatus 1a includes the following devices: An IP-I/O device 133 for establishing the connection with the IPv4 network 101 and the IPv6 network 102, a storage device 135 including, for example, a RAM 131, a ROM 132, and so on, and an arithmetic-logic device 130 for executing programs stored in the storage device 135 and performing the processing of various types of data stored in the storage device 135. The IP-I/O device 133, the storage device 135, and the arithmetic-logic device 130 are connected to each other through a bus 134 or the like. Here, in addition to the RAM 131 and the ROM 132, the converting apparatus 1a may have the other storage device such as a hard disk. In this case, the other storage device such as the hard disk is not necessarily connected directly to the bus 134.

The IP transmitting/receiving unit 2 illustrated in FIG. 1 includes the IP-I/O device 133, i.e., a network interface for performing the transmittance/reception of the IP (i.e., Internet Protocol) packets in FIG. 13, a program that is held in the storage device 135 and is needed for the operation of the IP transmitting/receiving unit 2, and the arithmetic-logic device 130 for executing the program. Also, the IP-I/O device 133 may perform the transmittance/reception processing of the packets for the IPv4 network 101 and the IPv6 network 102 in the following configuration: The IP-I/O device 133 is not controlled by the arithmetic-logic device 130 positioned in the different place, but the IP-I/O device 133 itself has the arithmetic-logic device 130 and the storage device 135 inside.

Each of the for-conversion IP address holding unit 3, the IP address conversion information holding unit 4, the IP multicast membership group managing unit 5, and the IP header converting unit 6 illustrated in FIG. 1 includes a program that is held in the storage device 135 and is needed for the operation of each unit, and the arithmetic-logic device 130 for executing the program.

FIG. 2 illustrates the configuration diagram of the IPv4 unicast address table 31. The IPv4 unicast addresses used for the IP header conversion are registered in advance into the IPv4 unicast address table 31 in accordance with the instruction from the manager of the converting apparatus 1a. It is assumed that, in FIG. 2, the IPv4 unicast addresses of 133. 144. 93. 100~133. 144. 93. 200 have been registered into the IPv4 unicast address table 31 in accordance with the instruction from the manager.

FIG. 3 illustrates the configuration diagram of the IPv4 multicast address table 32. The IPv4 multicast addresses used for the IP header conversion are registered in advance into the IPv4 multicast address table 32 in accordance with the instruction from the manager of the converting apparatus 1a. It is assumed that, in FIG. 3, the IPv4 multicast addresses of 238. 0. 0. 100~238. 0. 0. 200 have been registered into the IPv4 multicast address table 32 in accordance with the instruction from the manager.

FIG. 4 illustrates the configuration diagram of the IPv6 unicast address table 33. The IPv6 unicast addresses used for the IP header conversion are registered in advance into the IPv6 unicast address table 33 in accordance with the instruction from the manager of the converting apparatus 1a. It is assumed that, in FIG. 4, the IPv6 unicast addresses of 1 : : 100~1 : : 200 have been registered into the IPv6 unicast address table 33 in accordance with the instruction from the manager.

FIG. 5 illustrates the configuration diagram of the IPv6 multicast address table 34. The IPv6 multicast addresses used for the IP header conversion are registered in advance into the IPv6 multicast address table 34 in accordance with the instruction from the manager of the converting apparatus 1a. It is assumed that, in FIG. 5, the IPv6 multicast addresses of ff1e : : 100~ff1e : : 200 have been registered into the IPv6 multicast address table 34 in accordance with the instruction from the manager.

FIG. 6 illustrates the configuration diagram of the IP address conversion table 41. The IP address conversion table 41 holds the IPv4 multicast addresses and the IPv6 multicast addresses in correspondence with each other, the IPv4 multicast addresses being the IPv4 transmission destination addresses of the IPv4 multicast packets received by the converting apparatus 1a, the IPv6 multicast addresses having been acquired from the for-conversion IP address holding unit 3 by the instruction from the IP multicast membership group managing unit 5. Moreover, the IP address conversion table 41 holds the IPv4 unicast addresses and the IPv6 unicast addresses in correspondence with each other, the IPv4 unicast addresses being the IPv4 transmission source addresses of the IPv4 multicast packets received by the converting apparatus 1a, the IPv6 unicast addresses having been acquired from the for-conversion IP address holding unit 3 by the instruction from the IP address conversion information holding unit 4.

Also, the IP address conversion table 41 holds the IPv6 multicast addresses and the IPv4 multicast addresses in correspondence with each other, the IPv6 multicast addresses being the IPv6 transmission destination addresses of the IPv6 multicast packets received by the converting apparatus 1a, the IPv4 multicast addresses having been acquired from the for-conversion IP address holding unit 3 by the instruction from the IP multicast membership group managing unit 5. Moreover, the IP address conversion table 41 holds the IPv6 unicast addresses and the IPv4 unicast addresses in correspondence with each other, the IPv6 unicast addresses being the IPv6 transmission source addresses of the above-described IPv6 multicast packets, the IPv4 unicast addresses having been acquired from the for-conversion IP address holding unit 3 by the instruction from the IP address conversion information holding unit 4.

FIG. 7 illustrates the configuration diagram of the IPv4 multicast membership table 51. The IPv4 multicast addresses of the IPv4 multicast group, of which the converting apparatus 1a has become a member in accordance with the instruction from the manager of the converting apparatus 1a, are registered into the IPv4 multicast membership table 51.

Figures 8, 9:
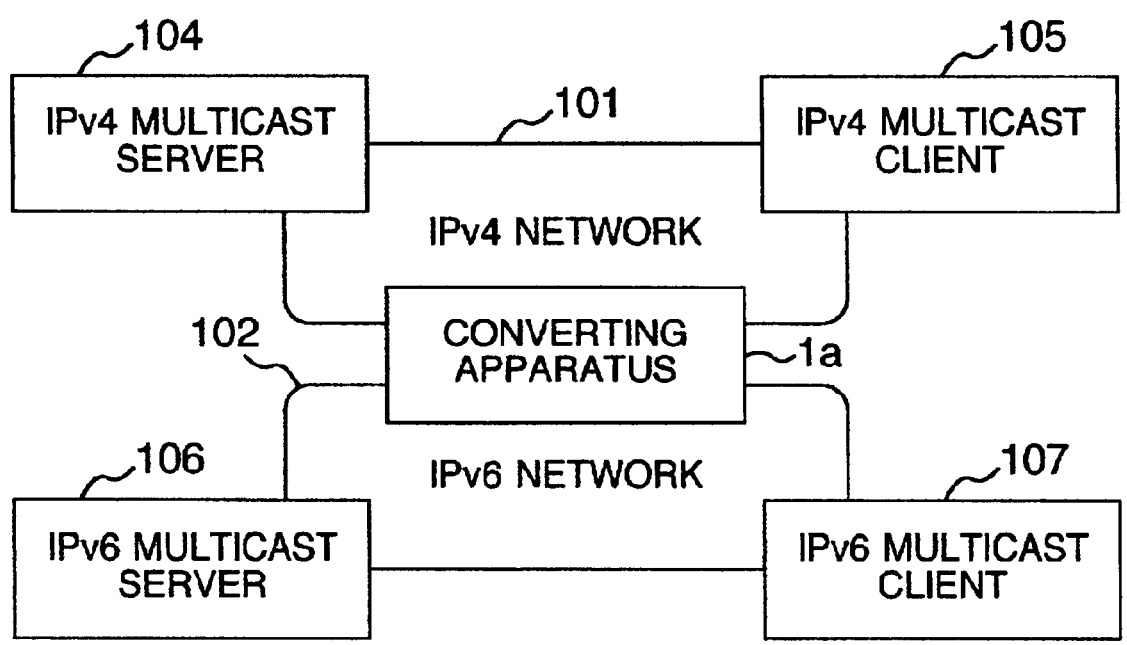
FIG. 8 illustrates the configuration diagram of an IPv6 multicast membership table.
FIG. 9 illustrates the configuration diagram of a communications network system according to the 1st embodiment of the present invention.

FIG. 8 illustrates the configuration diagram of the IPv6 multicast membership table 52. The IPv6 multicast addresses of the IPv6 multicast group, of which the converting apparatus 1a has become a member in accordance with the instruction from the manager of the converting apparatus 1a, are registered into the IPv6 multicast membership table 52.

The respective tables that have been presented in FIGS. 2 to 8 so far are stored into, for example, the respective corresponding storage regions of the storage device 135 in accordance with the control by the arithmetic-logic device 130.

FIG. 9 illustrates the schematic diagram of a communications network system where the IPv4 network 101 and the IPv6 network 102 are connected to each other through the converting apparatus 1a. An IPv4 multicast server 104 and an IPv4 multicast client 105 are connected to the IPv4 network 101. Here, the IPv4 multicast server 104 broadcasts (transmits) a multicast packet in compliance with IPv4, and the IPv4 multicast client 105 receives the multicast packet in compliance with IPv4. Similarly, an IPv6 multicast server 106 and an IPv6 multicast client 107 are connected to the IPv6 network 102. Here, the IPv6 multicast server 106 broadcasts (transmits) a multicast packet in compliance with IPv6, and the IPv6 multicast client 107 receives the multicast packet in compliance with IPv6.

Here, the following assumptions are made concerning the address assignment: An IPv4 address 133. 144. 93. 1 and an IPv6 address 1 : : 1 have been assigned to the converting apparatus 1a. Also, an IPv4 address 133. 144. 93. 2 has been assigned to the IPv4 multicast server 104. Also, an IPv4 address 133. 144. 93. 3 has been assigned to the IPv4 multicast client 105. Also, an IPv6 address 1 : : 2 has been assigned to the IPv6 multicast server 106. Also, an IPv6 address 1 : : 3 has been assigned to the IPv6 multicast client 107.

Also, the following assumptions are made: The IPv4 multicast server 104 broadcasts (transmits), to the IPv4 network 101, an IPv4 multicast packet the destination address of which is an IPv4 multicast address (238. 0. 0. 1). Similarly, the IPv6 multicast server 106 broadcasts (transmits), to the IPv6 network 102, an IPv6 multicast packet the destination address of which is an IPv6 multicast address (ff1e : : 1).

Additionally, in FIG. 9, the IPv4 network 101 and the IPv6 network 102 are physically isolated completely. However, even in the case where the IPv4 network 101 and the IPv6 network 102 exist in a mixed manner within the physically same network, the explanation given below concerning the embodiment guarantees that the converting apparatus 1a will function in much the same way.

Figure 10:
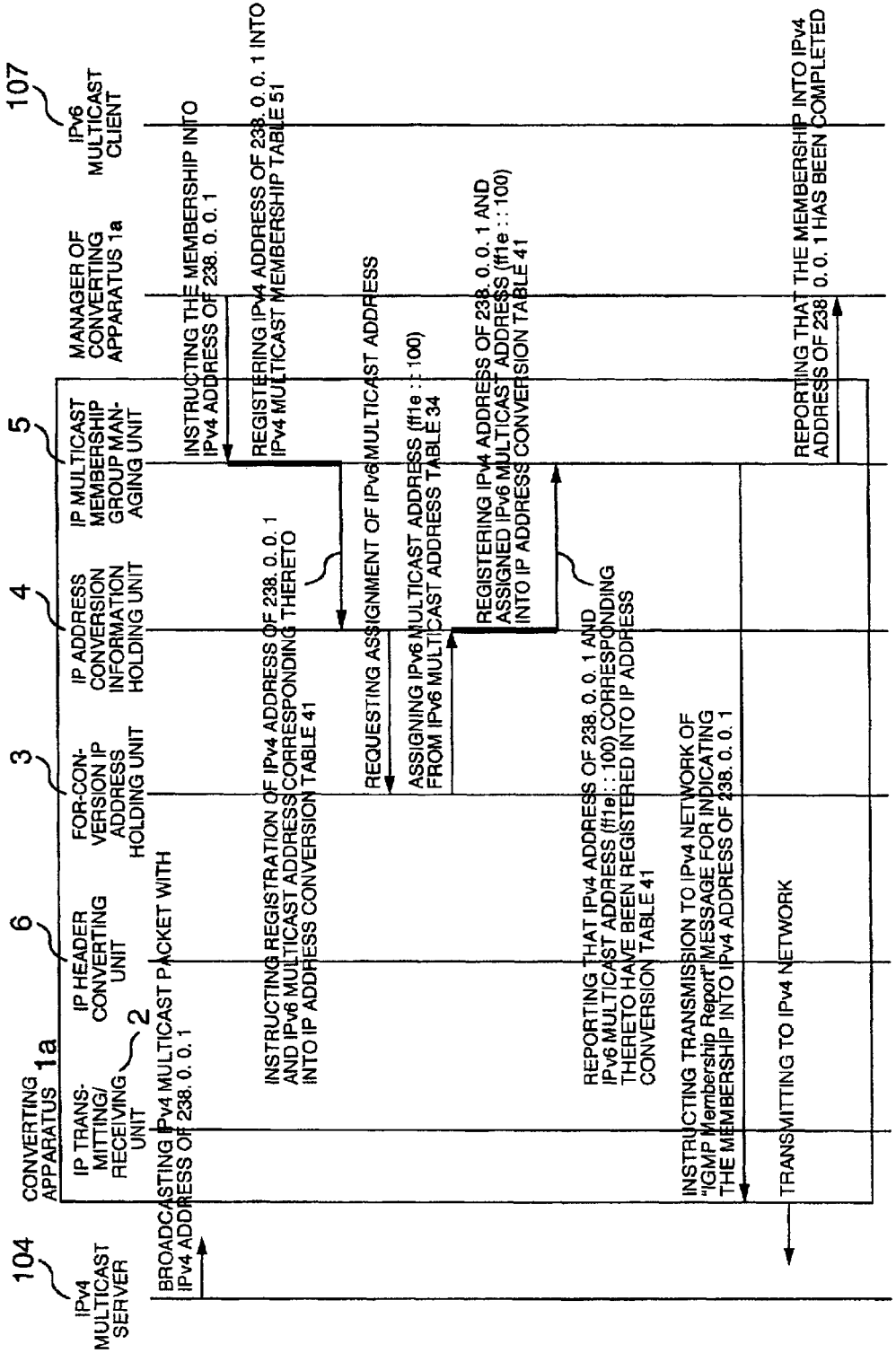
FIG. 10 illustrates a flowchart in the case where an IP multicast packet broadcast (transmitted) by an IPv4 multicast server is received by an IPv6 multicast client through the converting apparatus according to the 1st embodiment of the present invention.
Figure 11:
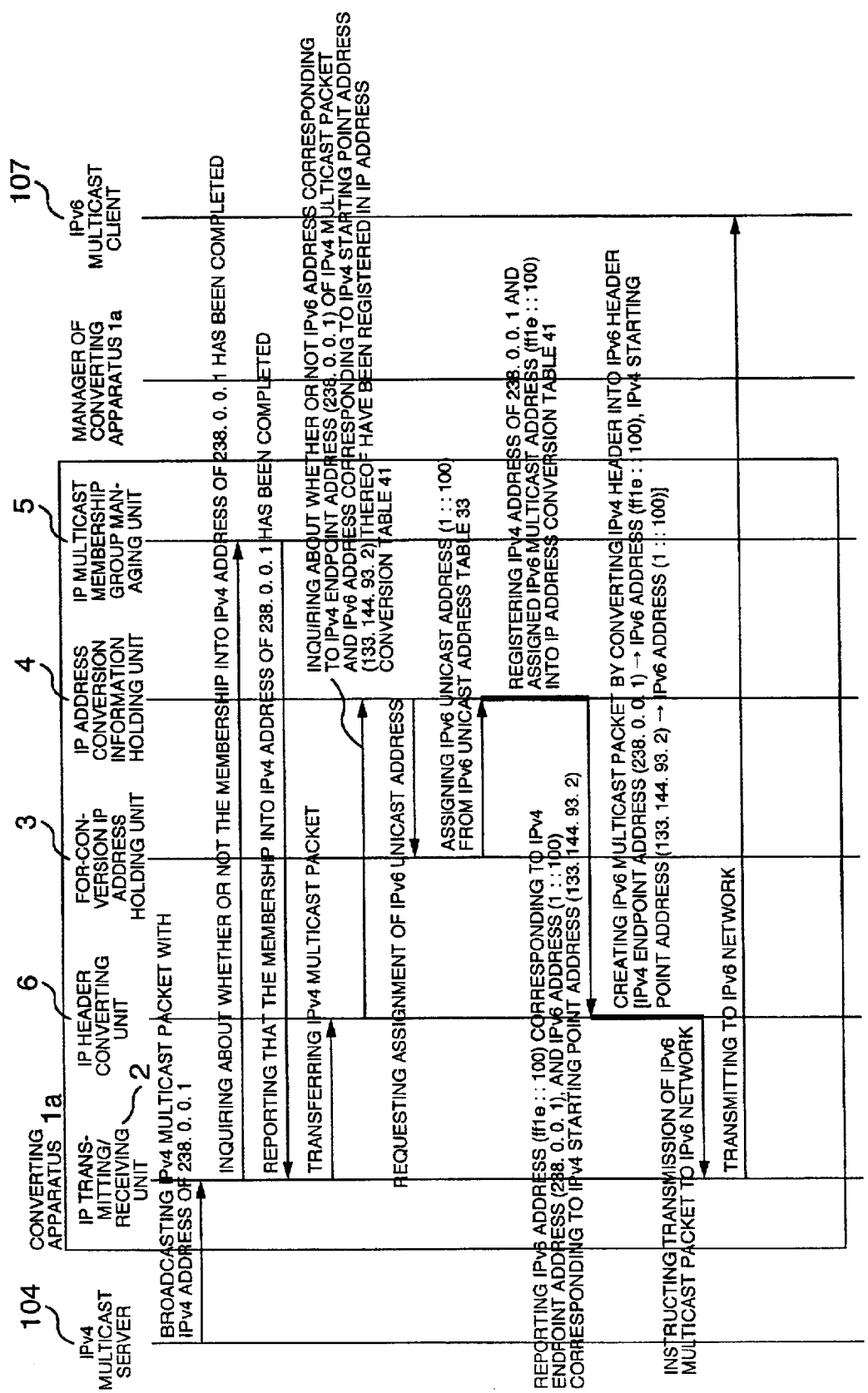
FIG. 11 illustrates a flowchart subsequent to the one in FIG. 10.

FIGS. 10 and 11 illustrate a flowchart in the following case: Using the IPv4 multicast address of 238. 0. 0. 1 as the destination address, the IPv4 multicast server 104 broadcasts (transmits) the IPv4 multicast packet to the IPv4 network 101. Next, the converting apparatus 1a receives the IPv4 multicast packet so as to subject the packet to the IP header conversion processing, then sending out the converted packet to the IPv6 network 102.

The IPv4 multicast server 104 broadcasts (transmits), to the IPv4 network 101, the IPv4 multicast packet the destination address of which is the IPv4 multicast address of 238. 0. 0. 1 (FIG. 10).

In order to relay the IPv4 multicast packet to the IPv6 network 102 by converting the IPv4 multicast packet into the IPv6 multicast packet, the manager of the converting apparatus 1a instructs the IP multicast membership group managing unit 5 to make the converting apparatus 1a become a member of the multicast group of the IPv4 multicast address (238. 0. 0. 1).

Having received the instruction from the manager, the IP multicast membership group managing unit 5, at first, registers the IPv4 multicast address (238. 0. 0. 1) into the IPv4 multicast membership table 51. Next, the IP multicast membership group managing unit 5 instructs the IP address conversion information holding unit 4 to register the IPv4 multicast address (238. 0. 0. 1) and the IPv6 multicast address corresponding thereto into the IP address conversion table 41.

The IP address conversion information holding unit 4 searches the IP address conversion table 41 with the IPv4 multicast address (238. 0. 0. 1). If the applicable entry has been found out, the IP address conversion information holding unit 4 makes a report to the effect toward the IP multicast membership group managing unit 5. If no applicable entry has been found out, the IP address conversion information holding unit 4 acquires the IPv6 multicast address from the for-conversion IP address holding unit 3, then registering, into the IP address conversion table 41, the IPv6 multicast address in a state of being made to correspond to the IPv4 multicast address (238. 0. 0. 1). Moreover, toward the IP multicast membership group managing unit 5, the IP address conversion information holding unit 4 makes a report to the effect that the IPv4 multicast address (238. 0. 0. 1) and the IPv6 multicast address corresponding to this address have been registered into IP address conversion table 41. At this step in FIG. 10, since no applicable entry has been found out, the IP address conversion information holding unit 4 acquires the IPv6 multicast address (ff1e : : 100) from the for-conversion IP address holding unit 3 so as to register the IPv6 multicast address into the IP address conversion table 41 in correspondence with the IPv4 multicast address (238. 0. 0. 1), then making the report to the effect toward the IP multicast membership group managing unit 5.

Having received from the IP address conversion information holding unit 4 the report to the effect that the entry corresponding to the IPv4 multicast address (238. 0. 0. 1) has been registered into IP address conversion table 41, the IP multicast membership group managing unit 5 instructs the IP transmitting/receiving unit 2 to transmit, to the IPv4 network 101, an "IGMP (i.e., Internet Group Management Protocol) Membership Report" message for indicating the membership into the IP multicast group of the IPv4 address (238. 0. 0. 1).

In accordance with the instruction from the IP multicast membership group managing unit 5, the IP transmitting/receiving unit 2 transmits the "IGMP Membership Report" message to the IPv4 network 101.

This allows the converting apparatus 1a to receive the IPv4 multicast packet that the IPv4 multicast server 104 broadcasts (transmits) to the IPv4 network 101 with the use of the IPv4 multicast address of 238. 0. 0. 1. Subsequently, the converting apparatus 1a executes the following processing, which is illustrated in FIG. 11.

The converting apparatus 1a receives the IPv4 multicast packet from the IPv4 network 101 through the IP transmitting/receiving unit 2. The IP transmitting/receiving unit makes an inquiry of the IP multicast membership group managing unit 5 about whether or not the converting apparatus 1a has become a member of the multicast group of the IPv4 destination address of the IPv4 multicast packet that the converting apparatus 1a has received.

The IP multicast membership group managing unit 5 checks whether or not the IPv4 destination address of the received IPv4 multicast packet has been registered in the IPv4 multicast membership table 51, then making a report on the result (i.e., membership-completed/membership-uncompleted) toward the IP transmitting/receiving unit 2. At this step in FIG. 11, since the IPv4 address of 238. 0. 0. 1 has been registered in the IPv4 multicast membership table 51, the IP multicast membership group managing unit 5 makes, toward the IP transmitting/receiving unit 2, the report to the effect of having been membership-completed.

When receiving from the IP multicast membership group managing unit 5 the report of having been membership-uncompleted, the IP transmitting/receiving unit 2 disposes the IPv4 multicast packet. When receiving from the IP multicast membership group managing unit 5 the report of having been membership-completed, the IP transmitting/receiving unit 2 transfers the IPv4 multicast packet to the IP header converting unit 6. At this step in FIG. 11, since the transmitting/receiving unit 2 has received the report of having been membership-completed, the IP transmitting/receiving unit 2 transfers the IPv4 multicast packet to the IP header converting unit 6.

Having received the IPv4 multicast packet from the IP transmitting/receiving unit 2, the IP header converting unit 6 makes an inquiry of the IP address conversion information holding unit 4 about the IPv6 address corresponding to the IPv4 destination address and the IPv6 address corresponding to the IPv4 source address.

First, the IP address conversion information holding unit 4 checks whether or not the IPv4 destination address has been registered in the IP address conversion table 41. If the IPv4 destination address has been registered therein, the IP address conversion information holding unit 4 makes, toward the IP header converting unit 6, a report on the IPv6 multicast address corresponding to the IPv4 destination address. If the IPv4 destination address has not been registered in the IP address conversion table 41, the IP address conversion information holding unit 4 makes, toward the IP header converting unit 6, a report to the effect of having not been registered. Here, since the IPv4 destination address (238. 0. 0. 1) has been registered in the IP address conversion table 41, the IP address conversion information holding unit 4 makes, toward the IP header converting unit 6, the report on the IPv6 multicast address corresponding thereto (ff1e : : 100).

Next, the IP address conversion information holding unit 4 checks whether or not the IPv4 source address has been registered in the IP address conversion table 41. If the IPv4 source address has been registered therein, the IP address conversion information holding unit 4 makes, toward the IP header converting unit 6, a report on the IPv6 unicast address corresponding to the IPv4 source address. If the IPv4 source address has not been registered in the IP address conversion table 41, the IP address conversion information holding unit 4 acquires the IPv6 unicast address from the for-conversion IP address holding unit 3. Moreover, after registering the acquired IPv6 unicast address and the IPv4 source address in correspondence with each other into the IP address conversion table 41, the IP address conversion information holding unit 4 makes a report on the registered IPv6 unicast address toward the IP header converting unit 6. At this step in FIG. 11, since the IPv4 source address (133. 144. 93. 2) has not been registered in the IP address conversion table 41, the IP address conversion information holding unit 4 acquires the IPv6 unicast address (1 : : 100) from the for-conversion IP address holding unit 3 so as to register the IPv6 unicast address into the IP address conversion table 41. After that, the IP address conversion information holding unit 4 makes the report on the IPv6 unicast address (1 : 100) toward the IP header converting unit 6.

The IP header converting unit 6 receives, from the IP address conversion information holding unit 4, the reports on the IPv6 multicast address and the IPv6 unicast address that correspond to the IPv4 destination address of the received IPv4 multicast packet and the IPv4 source address thereof, respectively. Moreover, the IP header converting unit 6 creates the IPv6 multicast packet from the received IPv4 multicast packet by the IP header conversion, then instructing the IP transmitting/receiving unit 2 to send out the created IPv6 multicast packet to the IPv6 network 102. In the IP header conversion, the IP header converting unit 6 converts the IPv4 destination address into the IPv6 multicast address corresponding thereto, and converts the IPv4 source address into the IPv6 unicast address corresponding thereto. When the IP header converting unit 6 has received, from the IP address conversion information holding unit 4, the report to the effect that the IPv4 destination address of the received IPv4 multicast packet has not been registered in the IP address conversion table 41, the IP header converting unit 6 disposes the received IPv4 multicast packet. At this step in FIG. 11, the IP header converting unit 6 has received, from the IP address conversion information holding unit 4, the reports on the IPv6 multicast address (ff1e : : 100) corresponding to the IPv4 destination address (238. 0. 0. 1) and the IPv6 unicast address (1 : : 100) corresponding to the IPv4 source address (133. 144. 93. 2). Furthermore, the IP header converting unit 6 converts the IPv4 destination address (238. 0. 0. 1) into the IPv6 destination address (ff1e : : 100) using the IPv6 multicast address, and converts the IPv4 source address (133. 144. 93. 2) into the IPv6 source address (1 : : 100) using the IPv6 unicast address. By executing the above-described processing, the converting apparatus 1a creates the IPv6 multicast packet from the IPv4 multicast packet. In addition, the converting apparatus 1a sends out the created IPv6 multicast packet to the IPv6 network 102 through the IP transmitting/receiving unit 2.

The IPv6 multicast client 107 becomes a member of the IPv6 multicast group of the IPv6 destination address (ff1e : : 100) of the IPv6 multicast packet created by the converting apparatus 1a. This membership makes it possible for the IPv6 multicast client 107 to receive this IPv6 multicast packet.

The above-described processing permits the IPv6 multicast client 107 to receive the IP multicast packet that the IPv4 multicast server 104 broadcasts (transmits) to the IPv4 network 101 with the IPv4 address of 238. 0. 0. 1.

In this embodiment, the explanation has been given regarding the case where the IPv6 multicast client 107 receives the IPv4 multicast packet that the IPv4 multicast server 104 broadcasts (transmits) to the IPv4 network 101 with the IPv4 address of 238. 0. 0. 1. Meanwhile, in the case as well where the IPv4 multicast client 105 receives the IPv6 multicast packet that the IPv6 multicast server 106 broadcasts (transmits) to the IPv6 network 102 using the IPv6 multicast address of ff1e : : 1 as the destination address, it is allowable to cause the converting apparatus 1a to execute the same processing in order to accomplish the object. Namely, first, the converting apparatus 1a becomes a member of the group of the IPv6 multicast packet that the IPv6 multicast server 106 broadcasts (transmits) to the IPv6 network 102. On account of this, the IP multicast membership group managing unit 5 instructs the IP transmitting/receiving unit 2 to transmit, to the IPv6 network 102, a "Multicast Listener Report" message described in, for example, RFC (i.e., Request For comments) 2710. This permits the converting apparatus 1a to receive the IPv6 multicast packet that the IPv6 multicast server 106 broadcasts (transmits) to the IPv6 network 102 using the IPv6 multicast address of ff1e : : 1.

The IP header converting unit 6 converts the IPv6 destination address (ff1e : : 100) of the IPv6 multicast packet into the IPv4 multicast address held in the IP address conversion table 41 in correspondence with the IPv6 multicast address, and converts the IPv6 source address into the IPv4 unicast address held in the IP address conversion table 41 in correspondence with the IPv6 unicast address. Moreover, the converting apparatus 1a causes the IP header converting unit 6 to subject the IPv6 multicast packet received from the IPv6 network 102 to the IP header conversion processing by the IP header converting unit 6.

Furthermore, the converting apparatus 1a sends out the created IPv4 multicast packet to the IPv4 network 101 through the IP transmitting/receiving unit 2. The above-described processing permits the IPv4 multicast client 105 to receive the IPv4 multicast packet created and sent out to the IPv4 network 101 by the converting apparatus 1a.

In this embodiment, the converting apparatus 1a has executed the IP header conversion toward the IPv4 multicast packet indicated by the manager. Other than this, it is also allowable to employ the configuration where the converting apparatus 1a executes the IP header conversion toward the IPv4 multicast packet that the converting apparatus 1a has automatically detected by monitoring the IPv4 network 101. Similarly, it is also allowable to employ the configuration where the converting apparatus 1a executes the IP header conversion toward the IPv6 multicast packet that the converting apparatus 1a has automatically detected by monitoring the IPv6 network 102.

In this embodiment, the explanation has been given regarding the case where the IPv4 destination address (238. 0. 0. 1) of the IPv4 multicast packet that the IPv4 multicast server 104 broadcasts (transmits) to the IPv4 network 101 is converted into the IPv6 multicast address (ff1e : : 100) acquired from the for-conversion IP address holding unit 3. Other than this, the IPv4 destination address (238. 0. 0. 1) of the IPv4 multicast packet that the converting apparatus 1a has received is also allowed to be converted into a 128-bit IPv6 address resulting from adding a fixed pattern to the higher-order bits of the IPv4 destination address (e.g., ff1e : : ffff : 238. 0. 0. 1).

Figure 12:
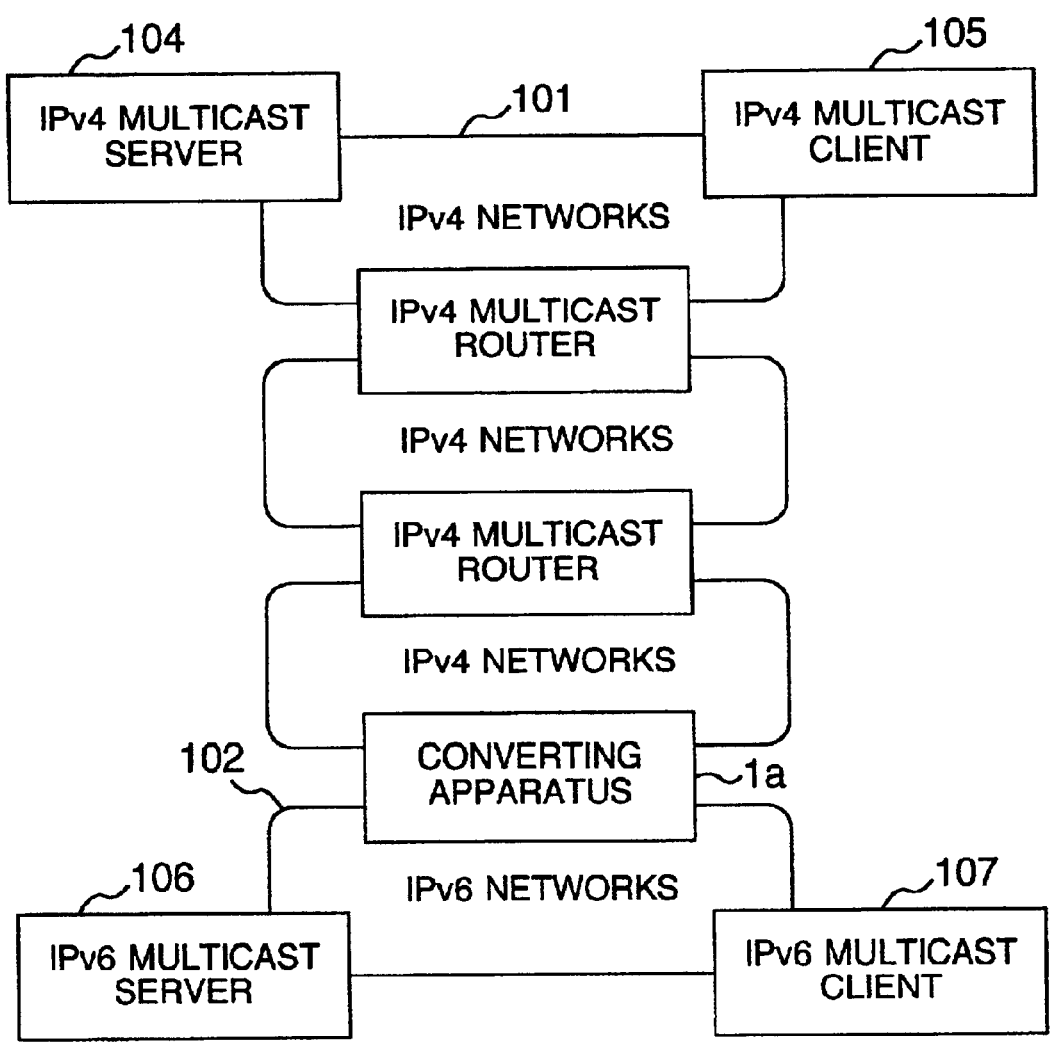
FIG. 12 illustrates the configuration diagram of a communications network system according to an embodiment differing from the 1st embodiment of the present invention.

In this embodiment, the explanation has been given regarding the case where, as illustrated in FIG. 9, the converting apparatus 1a and the IPv4 multicast server 104 are connected to the same IPv4 network 101. Other than this, as illustrated in FIG. 12, the case is also allowable where the converting apparatus 1a and the IPv4 multicast server 104 are connected to different IPv4 networks. In this case, the IGMP message that the converting apparatus 1a transmits in order to become the member of the IPv4 address of 238. 0. 0. 1 is received by an IPv4 multicast router 121. Then, a multicast routing protocol operates between the IPv4 multicast router 121 and an IPv4 multicast router 122, thereby causing the IPv4 multicast packet to be transferred from the IPv4 multicast server 104 up to the converting apparatus 1a. The case is also allowable where the converting apparatus 1a and the IPv6 multicast server 104 are connected to different IPv6 networks.

The present embodiments allow the IP multicast communication to be executed between the IPv4 terminal and the IPv6 terminal. As a result, it becomes possible for the IPv6 terminal to receive the IP multicast packet that is broadcast (transmitted) from the IPv4 terminal. Also, it becomes possible for the IPv4 terminal to receive the IP multicast packet that is broadcast (transmitted) from the IPv6 terminal.

What is claimed is:

1. A communicating apparatus connected to both of an IPv4 network and an IPv6 network, comprising:

an IP transmitting/receiving unit for executing transmittance/reception of an IPv4 packet with respect to said IPv4 network and executing transmittance/reception of an IPv6 packet with respect to said IPv6 network, an IP multicast membership group managing unit for holding IPv4 multicast addresses of a multicast group on said IPv4 network, said communicating apparatus being a member of said multicast group, a for-conversion IP address holding unit for holding IPv6 multicast addresses used on said IPv6 network, an IP address conversion information holding unit for holding at least one of said IPv4 multicast addresses and at least one of said IPv6 multicast addresses in correspondence with each other, said IPv4 multicast addresses being held by said IP multicast membership group managing unit, said IPv6 multicast addresses being acquired from said for-conversion IP address holding unit, and an IP header converting unit for converting said IPv4 multicast address of said IPv4 packet into said IPv6 multicast address, said IPv4 packet being received by said IP transmitting/receiving unit, said IPv6 multicast address being held in correspondence with said IPv4 multicast address by said IP address conversion information holding unit.

2. The communicating apparatus as claimed in claim 1, wherein said for-conversion IP address holding unit holds IPv6 unicast addresses used on said IPv6 network, said IP address conversion information holding unit holding said IPv6 unicast address and an IPv4 unicast address of said received IPv4 packet in correspondence with each other, said IPv6 unicast address being acquired from said for-conversion IP address holding unit, said IP header converting unit converting said IPv4 unicast address of said received IPv4 packet into said IPv6 unicast address held in correspondence with said IPv4 unicast address.

3. The communicating apparatus as claimed in claim 1, wherein, when said communicating apparatus becomes a member of a new multicast group on said IPv4 network, said IP multicast membership group managing unit instructs said IP transmitting/receiving unit to transmit, to said IPv4 network, a message for demanding said membership into said new multicast group.

4. The communicating apparatus as claimed in claim 1, wherein said IPv6 multicast address registered in said IP address conversion information holding unit is an address formed by adding a higher-order bit string of a fixed pattern to said IPv4 multicast packet registered in correspondence with said registered IPv6 multicast address.

5. A communicating apparatus connected to both of at least a 1st IP network and a 2nd IP network, comprising:
   an IP transmitting/receiving unit for executing transmittance/reception of a 1st IP packet with respect to said 1st IP network and executing transmittance/reception of a 2nd IP packet with respect to said 2nd IP network,
   an IP multicast membership group managing unit for holding 1st IP multicast addresses of a multicast group on said 1st IP network, said communicating apparatus being a member of said multicast group,
   a for-conversion IP address holding unit for holding 2nd IP multicast addresses used on said 2nd IP network,
   an IP address conversion information holding unit for holding at least one of said 1st IP multicast addresses and at least one of said 2nd IP multicast addresses in correspondence with each other, said 1st IP multicast addresses being held by said IP multicast membership group managing unit, said 2nd IP multicast addresses being acquired from said for-conversion IP address holding unit, and
   an IP header converting unit for converting said 1st IP multicast address of said 1st IP packet into said 2nd IP multicast address, said 1st IP packet being received by said IP transmitting/receiving unit, said 2nd IP multicast address being held in correspondence with said 1st IP multicast address by said IP address conversion information holding unit.

6. A packet converting method of converting a multicast packet transmitted on an IPv4 network into a multicast packet transmitted on an IPv6 network, comprising the steps of:
   preparing IPv6 multicast addresses used on said IPv6 network,
   holding IPv4 multicast addresses of a multi-cast group on said IPv4 network, a membership into said multicast group having been implemented,
   holding at least one of said held IPv4 multicast addresses and at least one of said prepared IPv6 multicast addresses in correspondence with each other,
   transmitting a message to said IPv4 network so as to receive said multicast packet, said message being transmitted for implementing a membership into a multicast group using an IPv4 multicast address of said IPv4 multicast packet,
   receiving said multicast packet,
   converting said IPv4 multicast address of said received IPv4 multicast packet into said IPv6 multicast address held in correspondence with said IPv4 multicast address, and
   transmitting said converted multicast packet to said IPv6 network.

7. The packet converting method as claimed in claim 6, further comprising the steps of:
   preparing IPv6 unicast addresses used on said IPv6 network,
   holding an IPv4 unicast address of said multicast packet and at least one of said prepared IPv6 unicast addresses in correspondence with each other, said multicast packet being subjected to said packet conversion, and
   converting said IPv4 unicast address into said IPv6 unicast address held in correspondence with said IPv4 unicast address.

8. The packet converting method as claimed in claim 6, wherein, at said step of preparing said 2nd IP multicast addresses, said 2nd IP multicast addresses are formed by adding a fixed bit string to a higher-order bit string of said 1st IP multicast addresses.

9. A communicating apparatus connected to an IPv4 network and an IPv6 network and comprising at least a storage device, an arithmetic-logic device, and an IP-I/O device, said communicating apparatus, by causing said arithmetic-logic device to execute a program stored in said storage device, executing the following processings of:
   storing IPv6 multicast addresses into a 1st storage region of said storage device, said IPv6 multicast addresses being used on said IPv6 network,
   transmitting a message to said IPv4 network by said IP-I/O device, said message demanding a membership into a multicast group using IPv4 multicast addresses used on said IPv4 network,
   holding at least one of said IPv4 multicast addresses of said multicast group and at least one of said IPv6 multicast addresses in correspondence with each other into a 2nd storage region of said storage device, said membership into said multicast group having been implemented, said IPv6 multicast addresses being stored in said 1st storage region,
   receiving an IPv4 multicast packet of said multicast group by said IP-I/O device, said membership into said multicast group having been implemented, and
   converting an IPv4 multicast address into an IPv6 multicast address, said IPv4 multicast address being a destination address contained in said received IPv4 multicast packet, said IPv6 multicast address being stored in said 2nd storage region in correspondence with said IPv4 multicast address which is said destination address.

* * * * *